May 26, 1964  E. E. MEDINA ETAL  3,134,548
SAFETY BELT
Filed May 15, 1962  2 Sheets-Sheet 1

Eufelio E. Medina
Elsie R. Cordova
INVENTORS

May 26, 1964  E. E. MEDINA ETAL  3,134,548
SAFETY BELT
Filed May 15, 1962  2 Sheets-Sheet 2
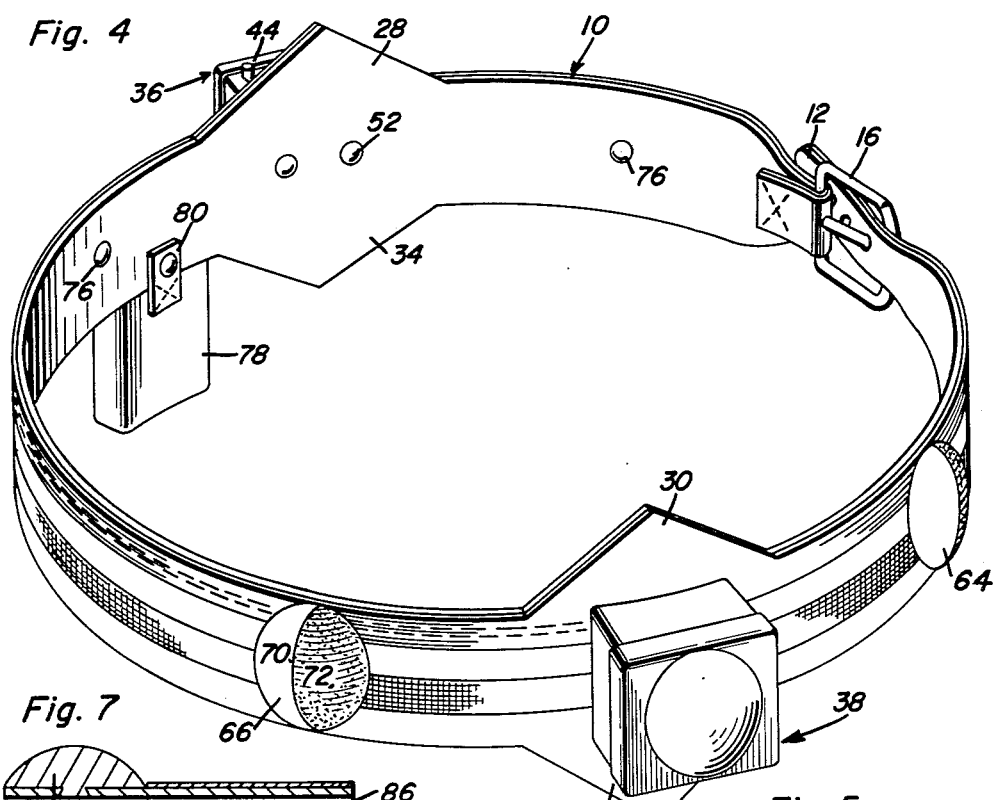
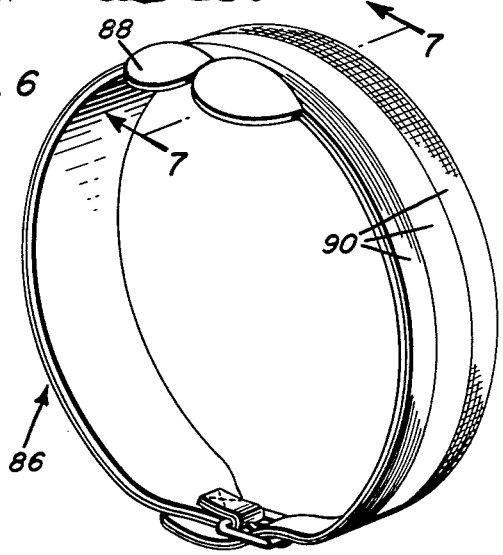
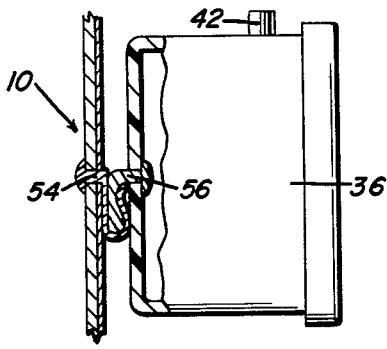
Eufelio E. Medina
Elsie R. Cordova
INVENTORS

United States Patent Office 3,134,548
Patented May 26, 1964

3,134,548
SAFETY BELT
Eufelio E. Medina, 613½ Galisteo, Santa Fe, N. Mex., and Elsie R. Cordova, Box 18B, Rte. 1, Santa Cruz, N. Mex.
Filed May 15, 1962, Ser. No. 194,791
3 Claims. (Cl. 240—59)

The present invention generally relates to safety devices, and more particularly to a safety device which can be worn by the user thereof as a waist encircling belt. Further, it is contemplated that the safety belt device of the present invention have utility as a means for protecting and identifying various animals.

The necessity, in many parts of the country, of walking along open highways at night has given rise to an increasing number of deaths caused by the inability of the drivers of automobiles to observe the pedestrians while traveling at high rates of speed. While many persons, in order to avoid such accidents, carry various illuminating means such as flashlights or lanterns, such means are generally cumbersome and inhibit a natural walking pace as well as the carrying of additional articles.

The present invention is specifically concerned with the provision of a comfortable and convenient means for properly illuminating a pedestrian so as to make the pedestrian clearly visible to approaching traffic. This is accomplished by the use of a safety belt containing multicolor stripes, some of a reflective material, various glass or plastic reflectors and a front and rear battery powered illuminated means.

In addition to providing a means for quickly identifying walking pedestrians, it is contemplated that the present device will be particularly useful as a means for quickly identifying hunters or campers, the front and rear illuminating means being sufficiently bright so as to project enough light to enable the user thereof to see thereby, much in the manner of a flashlight or lantern. Because of the manner in which the safety belt projects beams of light both forward and backward, it will also be noted that the belt would be particularly useful when encountering car trouble at night inasmuch as the driver of the car could proceed with the necessary repairs while at the same time illuminating both his work and himself so as to warn approaching automobiles.

Also, because of the manner in which the safety device of the present invention is constructed, it is equally adaptable for use with various animals, either with the illuminating means, or with just reflective means.

Accordingly, a primary object of the present invention involves the provision of a belt-like member which will immediately enable the recognition of the wearer thereof, particularly at night.

Also, another significant object of the present invention involves the provision of a safety belt including a self-contained illuminating means capable of projecting a beam of light both forward and rearward so as to enable the user thereof to guide himself while leaving the hands free.

Further, an object of the present invention involves the provision of a safety belt containing a plurality of different types of reflective means.

Additionally, an object of the present invention involves the provision of a safety device which can be quickly put on and removed.

Likewise, an object of the present invention involves the provision of a safety device which is relatively simple in construction, highly durable, attractive in appearance, and capable of being used in a manner so as to present little or no burden to the user thereof.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

FIGURE 4 is a rear perspective view of the safety belt of the present invention;

FIGURE 5 is a cross-sectional view illustrating an alternative manner of mounting the battery powered illuminating means;

FIGURE 6 is a perspective view illustrating a modified form of the present invention which is particularly adaptable for use with animals; and FIGURE 7 is a cross-sectional view taken substantially on a plane passing along line 7—7 in FIGURE 6.

Figure 1:
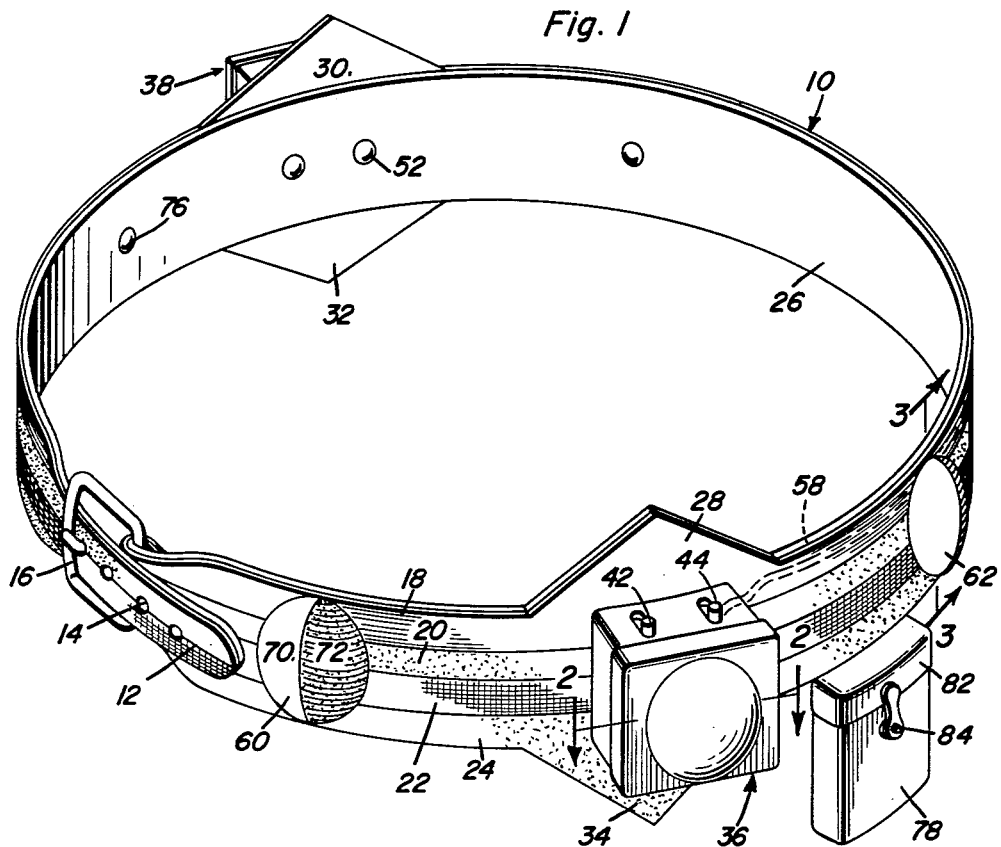
FIGURE 1 is a front perspective view of the safety belt comprising the present invention.

Referring now more particularly to the drawings, reference numeral 10 generally designates the safety belt comprising the present invention. This belt 10, intended to encircle the waist of a person, is provided at one end with a narrowed projecting tongue 12 containing a plurality of apertures 14 therein selectively engageable with a conventional belt buckle 16 secured to the other end of the belt 10 in any suitable manner.

The belt 10, generally two inches wide, is provided with a plurality of longitudinally extending strips having different reflective properties. The preferred arrangement involves the provision of a red strip 18 at the top, the second strip 20 being of a highly reflective material of the type which generally sparkles upon being struck by light from an external source, such reflective material 20 being conventional and of any well known type such as Scotchlite, the third strip 22 being black, and the fourth or bottom strip 24 being of a sparkling material similar to strip 20. While these are the preferred types of strips, it is readily apparent that various other colors and arrangements can be used within the scope of the present invention. These strips 18–24, if so desired, can be applied to a belt case 26, of any suitable material. However, it is also contemplated that the entire belt be formed as an integral unit with the various different strips forming the body of the belt 10.

It will be noted that the device 10 is intended to be worn with the buckle 16 at the side of the user, the front and rear of the belt 10 being formed with upward projecting portions 28 and 30 downwardly projecting portions 32 and 34. These projecting portions 28–34 can be of the same color or construction as the adjacent strips 18–24, however, a contrasting color can be used if desired. The enlarged front and rear area formed by these projecting portions forms a substantial base for the mounting of the front and rear illuminating means 36 and 38. These illuminating devices 36 and 38 are intended to contain their own source of power, such as batteries 40 mounted in the front illuminating means 36. In order to selectively control the illumination of these two means 36 and 38, two switches 42 and 44 are provided on the front illuminating means 36, with the switch 42 being for the front device 36 and the switch 44 being for the rear device 38.

Figure 2:
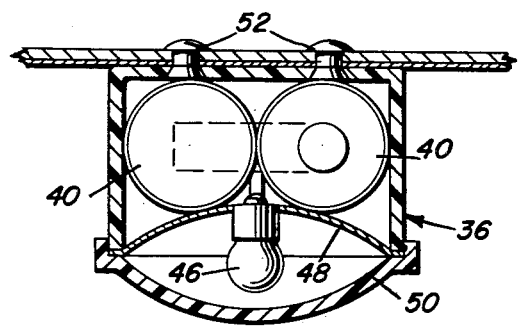
FIGURE 2 is a cross-sectional view taken substantially on a plane passing along 2—2 in FIGURE 1.

With reference to FIGURE 2, it will be noted that these devices contain a conventional flashlight bulb 46 through a reflector 48 and secured in position by a transparent snap-on combination cap and lens 50, conventional contacts being provided in conjunction with the bulbs 46 in both the front and rear illuminating means 36 and 38, and a suitable electrical conductor 58 being in current receiving communication with the batteries 40 and extending to the rear bulb contacts. The entire device can be mounted on the belt by rivets 52, however, in the event that it is found preferable to provide that the illuminating means 36 and 38 be removable, they can be mounted by means of hooks 54 secured to the belt 10 and engageable with hooks 56 extending through the rear of the illuminating means 36 and 38 as illustrated in FIGURE 5. It will be noted that the use of such releasable hooks 54 and 56 will also require that the conductor or wire 58 be secured to either the interior or exterior of the belt in a releasable manner which can also consist of hooks (not illustrated).

Figure 3:
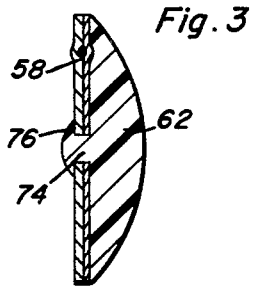
FIGURE 3 is a cross-sectional view taken substantially on a plane passing along 3—3 in FIGURE 1.

In addition to the strips 18–24 and the illuminating means 36 and 38, it is contemplated that the safety belt 10 be provided with four reflectors, two of these reflectors 60 and 62 being on either side of the front illuminating means 36, and two reflectors 64 and 66 being on opposite sides of the rear illuminating means 38. It is preferred that each reflector 60, 62, 64 and 66 be formed into vertical halves, one-half 70 being of a light reflective material, and the other half 72 being of a bright red sparkling substance capable of being brightly illuminated upon being struck by light from an external source. These reflectors, as illustrated in FIGURE 3, can be secured to the belt by the provision of a rearwardly extending portion 74 having an enlarged head 76 thereon.

In order to always insure an adequate source of power for the illuminating means 36 and 38, a pouch 78 is provided for the carrying of additional batteries 40. This pouch 78 can be secured to the belt 10 in any conventional manner such as by the strap 80. Also, in order to protect the enclosed batteries, a cover 82 having a snap fastener 84 thereon is provided on the pouch 78.

Turning now to FIGURES 6 and 7, it will be noted that a belt or collar 86 has been illustrated therein. It was contemplated that this collar 86 be used on animals, particularly dogs, so as to provide a means for readily observing the animal upon the reflection of an automobile's headlights by the reflectors 88 or the reflective strips 90, both the reflectors 88 and the strips 90 being similar to the strips and reflectors of the belt 10. While this belt or collar 86 is particularly adaptable for use with animals, it will be readily apparent that such can, if so desired, be worn by a person, and conversely, the safety device 10 of FIGURES 1–5 can likewise be worn by an animal.

In view of the foregoing, it is considered to be apparent that a novel safety device has been defined which enables the wearer thereof to be readily observed by approaching traffic, and additionally, provides a source of illumination so as to enable the wearer thereof to find his way without the necessity of holding a flashlight or lantern in his hands, thus leaving his hands free for other tasks. These advantages are provided by the use of a combination of self-powered illuminating means and additional means capable of reflecting any external light coming in contact therewith, both mounted on a body encircling belt provided with a releasable fastener enabling the quick putting on and removal of the entire device.

As will be appreciated, the safety belt of the present invention can be used twenty-four hours a day in all sorts of weather conditions with the reflection of the sun by the reflectors being visible for miles on clear days and with the glow from the illuminating means being equally visible on cloudy days. Further, because of the frequency of unexpected snow and rain storms in some parts of the country, this safety belt, when worn by a lost hunter or camper, would be an invaluable aid in their detection either day or night by fellow campers or hunters as well as other search parties.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. A safety device comprising a body encircling strap provided with a releasable fastener for the ends thereof, and a plurality of elongated strips thereon, said strips extending substantially the full length of said strap, with two laterally spaced ones of said strips being of a highly light reflective material and a third strip positioned between the two spaced strips and being of a generally non-reflective material so as to present two spaced bands of reflected light encircling the body of the wearer.

2. A safety device comprising a body encircling strap provided with a releasable fastener for the ends thereof, and a plurality of elongated strips thereon, said strips extending substantially the full length of said strap, with two laterally spaced ones of said strips being of a highly light reflective material and a third strip positioned between the two spaced strips and being of a generally non-reflective material so as to present two spaced bands of reflected light encircling the body of the wearer, a plurality of curved reflectors mounted on and peripherally spaced about said strap, said reflectors being of a height substantially equal to the width of the strap, diametrically opposed portions of the body encircling strap being laterally enlarged, these enlarged portions being positioned at the front and rear of the wearer's body, self-contained battery powered illuminating means, and releasable fastening means on said strap and said illuminating means releasably mounting said illuminating means on said strap, said illuminating means consisting of a first light case having a bulb and battery means therein, said first light case being mounted on the front enlarged portion, conductor means extending between and connected to the bulb and battery means for energization of the bulb by the battery means, switch means for controlling this energization mounted on said first light case, a second light case having a second bulb therein, said second light case being mounted on the rear enlarged portion, conductor means extending between and connected to the battery means in the first light case and the bulb in the second light case for energization of the second bulb by the battery means, and second switch means also mounted on said first light case for controlling the energization of the second bulb.

3. A safety device comprising a body encircling strap provided with a releasable fastener for the ends thereof, diametrically opposed portions of the body encircling strap being laterally enlarged, these enlarged portions being posititoned at the front and rear of the wearer's body, self-contained battery powered illuminating means, and releasable fastening means on said strap and said illuminating means releasably mounting said illuminating means on said strap, said illuminating means consisting of a first light case having a bulb and battery means therein, said first light case being mounted on the front enlarged portion, conductor means extending between and connected to the bulb and battery means for energization of the bulb by the battery means, switch means for controlling this energization mounted on said first light case, a second light case having a second bulb therein, said second light case being mounted on the rear enlarged portion, conductor means extending between and connected to the battery means in the first light case and the bulb in the second light case for energization of the second bulb by the battery means, and second switch means also mounted on said first light case for controlling the energization of the second bulb.

References Cited in the file of this patent

UNITED STATES PATENTS

| | | |
|---|---|---|
| 1,739,289 | Carter | Dec. 10, 1929 |
| 1,825,088 | Powell et al. | Sept. 29, 1931 |
| 2,378,075 | Frecska | June 12, 1945 |
| 2,502,535 | Richards | Apr. 4, 1950 |